United States Patent

[11] 3,588,095

| [72] | Inventors | Henry D. Ward, Jr.<br>Phoenix;<br>William F. Ward, Hampstead; John H.<br>Bachmann, Jr., Fallston, Md. |
|---|---|---|
| [21] | Appl. No. | 756,182 |
| [22] | Filed | Aug. 29, 1968 |
| [45] | Patented | June 28, 1971 |
| [73] | Assignee | The Ward-Turner Machinery Company<br>Baltimore, Md. |

[54] SUCTION TABLE SYSTEM FOR FEEDING OF WARPED SHEETS
15 Claims, 7 Drawing Figs.

| [52] | U.S. Cl. | 271/44 |
|---|---|---|
| [51] | Int. Cl. | B65h 1/06 |
| [50] | Field of Search | 271/26, 32, 42, 44, 54, 62, 61, 44 (SS), 74 |

[56]          References Cited
UNITED STATES PATENTS

| 3,096,087 | 7/1963 | Markley | 271/32 |
|---|---|---|---|
| 3,105,681 | 10/1963 | Bishop | 271/32 |
| 3,171,647 | 3/1965 | Bishop | 271/32 |
| 2,827,290 | 3/1958 | Dixon | 271/44 |
| 3,151,863 | 10/1964 | Lohr | 271/61 |

*Primary Examiner*—Richard E. Aegerter
*Attorney*—Walter G. Finch

ABSTRACT: A suction type of feeder system is provided for handling and processing of sheets, some of which are warped, used in the manufacturing of boxes. The apparatus includes a perforated top vacuum box, which is positioned under a hopper containing sheets of corrugated paperboard to be fed through the system. Across the top of the vacuum box, there is provided a timed feeder plate which reciprocates to extend across the top of the box in contact therewith.

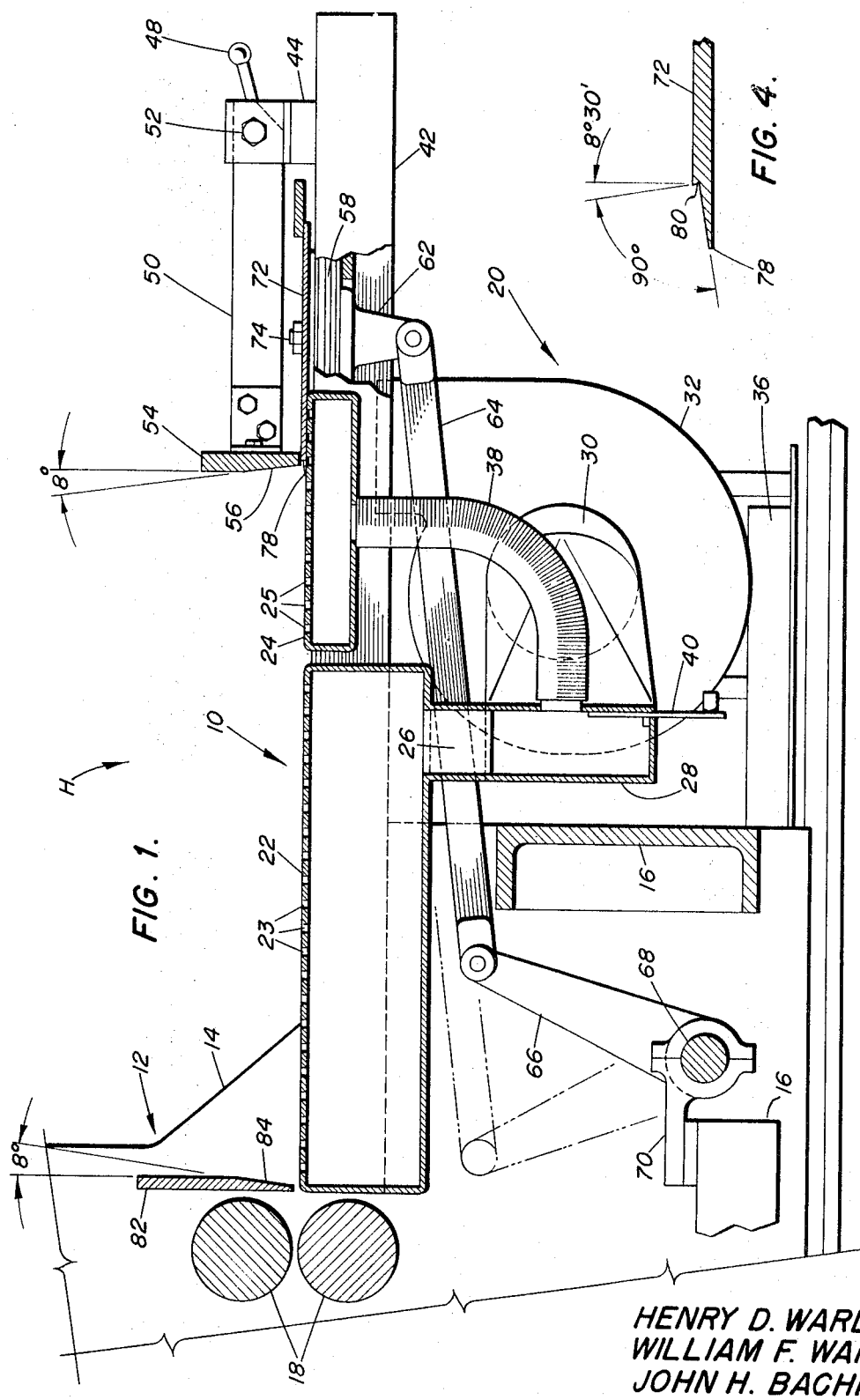

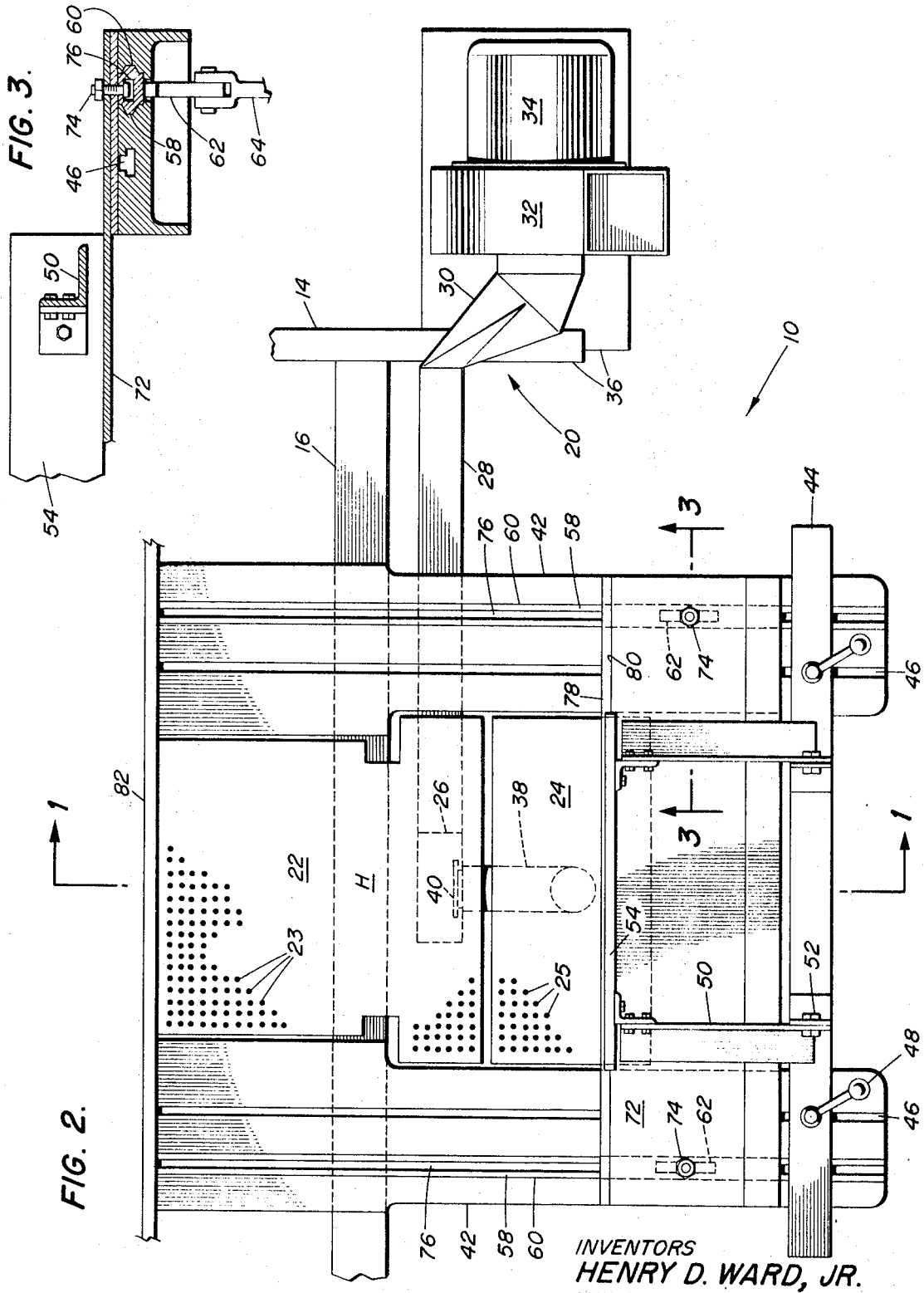

BEGIN FEED STROKE

END FEED STROKE-START RETURN

MIDWAY OF RETURN STROKE

INVENTORS
HENRY D. WARD, JR.
WILLIAM F. WARD
JOHN H. BACHMANN, JR.
BY Walter G. Finch
ATTORNEY

SUCTION TABLE SYSTEM FOR FEEDING OF WARPED SHEETS

A front gate and a rear face are provided at the front and back sides of the hopper respectively, and these have outwardly depending tapered shape so as to allow space for the bottom sheet in the hopper to be pulled flat.

The lowermost sheet is pulled down by the vacuum, and it is set down in line with the feeder plate first at its center and then at the leading and trailing edges thereof. The latter edge is engaged by the timed feeder plate as it moves under the rear face and it pushes the sheet bodily beneath the front gate into the nip of feeder rollers in time with the feeder plate and into subsequent processing of the sheet.

The feeder plate forward movement increasingly covers the vacuum ports in the top of the vacuum box to prevent the loss of negative pressure beneath the leading edge of the sheet and to shield and prevent the next sheet from being pulled down until the reverse stroke.

To accommodate longer sheets, the vacuum box is made in two sections, the rearward section being adjustably positioned so as to work against the trailing edge of the sheet. In the reverse stroke of the feeder plate, the separating feeder plate and the trailing edge of the prior sheet valve the vacuum to the center of the next sheet.

This invention relates generally to sheet feeders used in the box manufacturing industry, and more particularly it pertains to bottom feed reciprocating feeders especially capable of handling sheets such as warped carton blanks for processing in die cutting machines.

In the field of box manufacturing, it is a severe problem to rapidly and individually feed carton blanks to printer-slotters or rotary die cutters.

Handling of warped sheets is quite a problem in box manufacturing plants, and there is a need for a feeder system to take severely warped sheets which normally would not be fed and would have to be scrapped, and be able to feed them through a printer-slotter, for example, for processing at high rates of speed.

Skipping or double feeding causes loss in time and possible damage of the sheets. Furthermore, it is important that each sheet be brought down and temporarily held in a predetermined register for introduction to the further processing.

Accordingly, it is an object of this invention to provide a more positive bottom feeder of sheets which can bring down only one sheet at a time and which does so with improved placement accuracy.

Another object of this invention is to provide a sheet feeder for warped sheets whereby the leading and trailing edges of a sheet are presented for feeding only after the preceding sheet has been moved out and the feeder plate retracted, respectively.

To provide a bottom feeder which requires only a single feeder plate to advance both long and short blanks, is yet another object of the invention.

Another object of this invention is to provide a vacuum-type sheet feeder in which the preceding blank and the feeder plate act as sliding valves to expose selected areas of the subsequent blank to pull down force.

Other objects and advantages of the invention will become more readily apparent and understood from the following detailed specification and accompanying drawings in which:

FIG. 1 is a longitudinal section taken along line 1-1 of FIG. 2 with parts being shown in elevation of a warped sheet feeder incorporating features of this invention;

FIG. 2 is a plan view thereof;

FIG. 3 is a detail sectional view taken on line 3-3 of FIG. 2 showing the sliding feed bar and ways;

FIG. 4 is an enlarged detail depiction of the lip of the feeder plate; and

Figure 5:
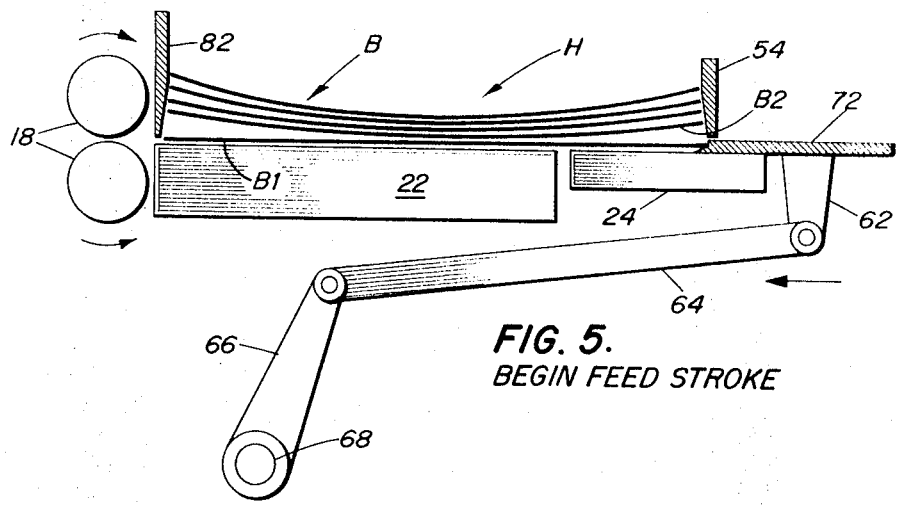
Figure 6:
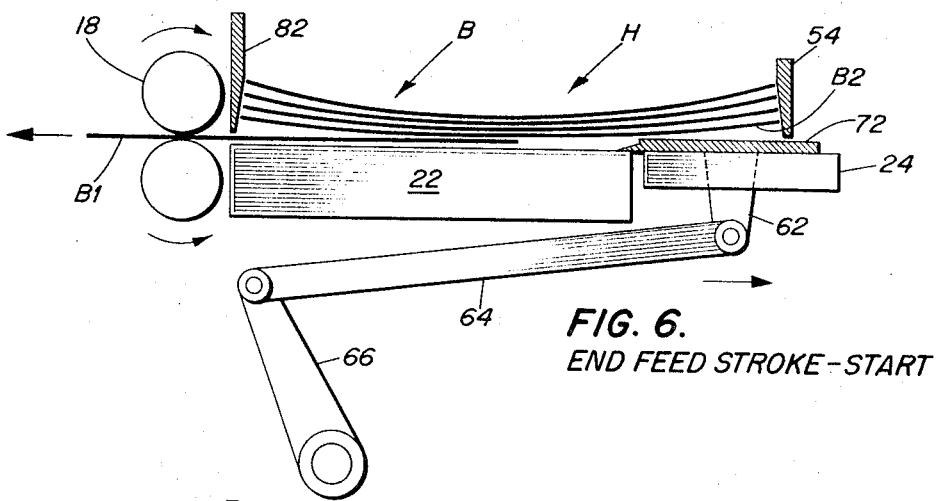
Figure 7:
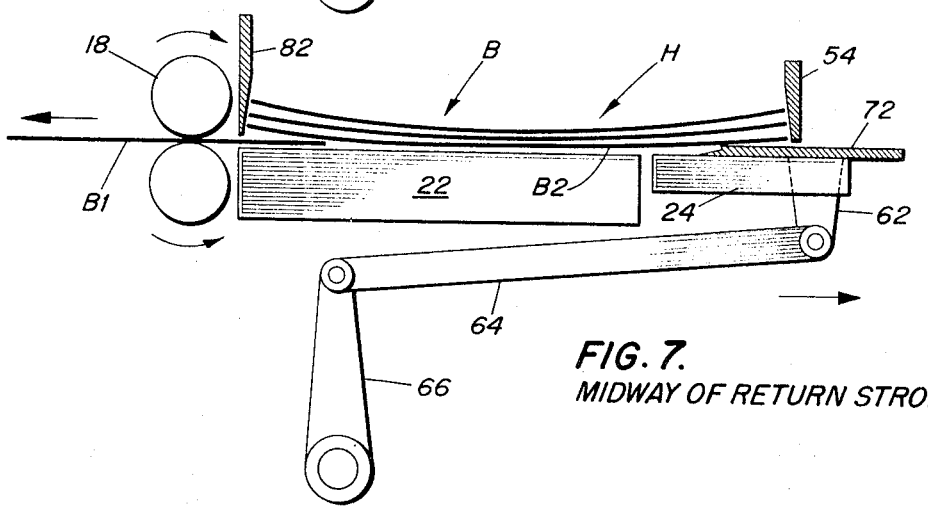

FIGS. 5, 6, and 7 are schematic diagrams illustrating the sequence of operation of the machine as a sheet moves through a feed cycle.

A suction type of feeder system 10 is shown in FIGS. 1 and 2, which includes a feed table arrangement for feeding paper blanks to a printer-slotter or die cutting machine 12. Reference numeral 14 indicates portions of the sidewalls of the machine 12 since the remainder of the machine is conventional for subsequent processing operations as desired after a blank sheet clears the nip of feed rolls 18.

A vacuum system 20 is mounted on one of the crossties 16 of the feeder system 10 and it consists of a main vacuum box 22, and an adjustable vacuum box 24. A centrifugal blower 32 is operated by a motor 34. The blower 32 and motor 34 are mounted on structure 36 which depends from the sidewalls 14.

Vacuum ducting to the intake of the blower 32 consists of a transition section 30 joined to a transverse duct 28. A short vertical section of exhaust duct 26 next connects to the main vacuum box 22.

The adjustable vacuum box 24 is connected by means of a flexible hose 38 through a shutoff gate 40 to the transverse duct 28. The tops of the vacuum boxes 22 and 24 are perforated with apertures 23 and 25 respectively.

The feeder system or machine 10 has long conventional feed table arms 42 which extend to the rear and overhang the blower and are spaced to allow the tops of the vacuum boxes 22 and 24 to be flush therealong.

An adjustable crossbeam support 44 is secured to inverted T slots 46 in the arms 42 by fastening devices with handles 48. A pair of support arms 50 extend forwardly from hinges 52 on the crossbeam support 44 and carry a backstop 54 fastened across their free ends. The backstop 54 is machines with a downwardly narrowing taper by sloping the forward face 56 about 8 degrees from vertical.

With supplementary reference to FIG. 3, a ways slot 60 is provided lengthwise in each feed table arm 42 for sliding feed bars 58. A bracket 62 of these feed bars 58 depends through the ways slot 60 and is pivotally attached to a connecting rod 64. The other end of the connecting rod 64 is pivotally attached to an oscillating lever 66 as shown in FIG. 1.

The lever 66 is driven by a shaft 68 journaled in a bracket 70 on a crosstie 16 and is timed to function with the speed of the feed rolls 18 and other subsequent functioning elements, not shown, of the feeder system 10 such as die cutters, etc.

A feeder plate 72 is secured with a fastener 74 to inverted T-slots 76 in the sliding feedbars 58 and moves with the latter flush with the top surfaces of the vacuum boxes 22 and 24. The forward margin of the feedbar 58 is machined with a knife edge 78, as best shown in FIG. 4, with a slope preferably of 8°30' from the horizontal so as to leave a feeding edge or lip 80 sloping the same amount from the vertical and inclined in a forward direction. It is to be noted that different styles of feeder plates are used, depending upon the size of the sheet.

The front or feed gate 82 of the feeder system 10 is adjustably mounted by means, not shown, to extend its central portion across the forward end of the main vacuum box 22 and clear it and the feed table arms 42 by the thickness of the blanks to be fed. This feed gate 82 is machined with a downwardly narrowing taper by sloping the rear face 84 about 8 degrees from vertical.

The area between the feed gate 82 and the back stop 54 define a hopper H which, with adjustable side plates, not shown, receives a stack of blanks B as shown in FIG. 5. The hopper H is so designed that it will accept all available sheets that can be fed on the feeder system 10. For example, a minimum sheet used in a 66×100 inch die cutter machine 12 is approximately 18 inches deep and about 15 inches wide. The hopper H can accept all of these sheets, with the feeder system 10 handling and processing the sheets.

The backstop bar is also adjustable from approximately 18 inches to almost approximately 64 inches from the gates to accommodate all different lengths of sheet. Side guides, which are not shown, are also adjustable to accommodate different widths of sheet.

In the present feeder system or machine 12, the vacuum boxes 22 and 24 are approximately 30 inches wide. This is wide enough to control the leading edge of the sheet. If a wider carton or sheet is being fed, the gates 82 are set so that they will be over the vacuum box 22. The vacuum box 22 will suck the leading edge of the sheet down, namely, the edge over the box 22 so that it will go underneath the gate 82. The edges of the sheet not over the vacuum box 22 are free, but this will not affect the operation of the feeder system 10.

A 66×100 inch die cutter machine 12 can feed approximately 175 sheets a minute, but this is no limitation on the vacuum design of the feeder system 10. The feeder system 10 can be adapted to a 50×113 inch printer slotter, the speed of which is approximately 225 sheets, maximum, a minute. Also, the feeder system 10 can be adapted to a 37½×80 inch printer slotter, the sheet speed of which is approximately 325 sheets maximum being processed per minute.

In operation, after the hopper H is initially filled, the vacuum boxes 22 and 24 immediately suck down flat the first blank $B_1$. Let it be assumed that this blank $B_1$ is fed into the nip of rotating rolls 18 by the forward motion of the feeder plate 72 engaging with its lip 80 the rear edge of the blank as shown in FIG. 5.

As shown in FIG. 6, the feeder plate 72 starts its return stroke to the rear and the trailing rear edge of the blank $B_1$ and the forward edge of the plate 72 separate. Now the centermost portion of the next blank $B_2$ is becoming exposed to the vacuum from vacuum box 22, as shown in FIG. 6 and it is bowed downwardly to begin adhering to the box in that area.

As the action continues, the departing blank $B_1$ being pulled through the nip rolls 18 and the retracting feeder plate 72 expose respectively more of the forward ro leading edge and of the trailing edge respectively on blank $B_2$ until this blank $B_2$ is flattened out, and held by vacuum and ready to be pushed forward into the nip rolls 18.

This is then the end of the operational cycle when the feeder plate 72 unshields from vacuum the trailing edge of the blank $B_2$ to lastly cause it to be sucked down by the adjustable vacuum box 24 ready to receive the feeding edge 80 on a next feed stroke. At the same time, the first blank $B_1$ has unshielded the forward or leading edge of blank $B_2$ to position it for introduction under the feed gate 82.

It should be understood that for short blank feeding, the adjustable vacuum box 24 may be dispensed with to allow easier loading of small blanks. The shutoff gate 40 is then closed. Action is exactly the same with only the main vacuum box 22 in use.

Obviously many modifications and variations of the present invention are possible in light of the above teachings. It is therefore, to be understood that within the scope of the appended claims the invention may be practiced otherwise than as specifically described.

We claim:

1. A sheet feeding system for feeding sheets from the bottom of a stack thereof, comprising, structure including a threshold member and gate means spaced therefrom to form an opening along one side of said stack for the passage of the lowermost sheet of said stack through said opening, means including a perforated vacuum box positioned below said stack for engaging by suction the bottom surface of the lowermost sheet of said stack through said opening, means including a perforated vacuum box positioned below said stack for engaging by suction the bottom surface of the lower most sheet of said stack on the top surface of said box, means for exposing initially at least a centermost portion of the bottom surface of each successive lowermost sheet to an adjacent portion of said perforated vacuum box to permit said centermost portion to be moved into suction adherence with said adjacent portion of said box and for thereafter exposing successive portions of at least some of the remaining bottom surface of said each successive lowermost sheet until at least some of said remaining bottom surface is also in suction adherence with said vacuum box, and reciprocating means including an engaging lip positioned along the opposite side of said stack for positively engaging the trailing end of said lowermost sheet and pushing said lowermost sheet through said opening after the bottom surface of said lowermost sheet has been engaged by suction on the top surface of said box.

2. A sheet feeding system as recited in claim 1, and additionally means for applying a negative pressure to said box.

3. A sheet feeding system as recited in claim 1, and additionally means for moving said reciprocating means forwardly and rearwardly in a predetermined cycle of operation.

4. A sheet feeding system as recited in claim 1, wherein said reciprocating means is arranged in contact engagement with the top surface of said box to at least partially seal off the surface thereof.

5. A sheet feeding system as recited in claim 1, wherein said vacuum box is formed of at least two spaced sections, with the rearwardmost pressure section being adjustably positioned so as to work against the trailing end of said lowermost sheet.

6. A sheet feeding system as recited in claim 1, wherein said gate means is adjustable to vary the size of said opening.

7. A sheet feeding system as recited in claim 1, and additionally hopper means for containing said stack of sheets.

8. A suction-type feeding system for feeding of sheets from the bottom of a stack thereof, comprising, means including forward and rear perforated top negative pressure boxes, hopper means for containing said stack of sheets positioned above said negative pressure boxes, gate means provided at the front and rear of said hopper means adjacent to spaced front and rear edges of the top of said forward and rear negative pressure boxes, respectively, to form openings between said gate means and the top of said negative pressure boxes, reciprocating means including a lip arranged to extend through said opening of said rear gate means across the top of said rear negative pressure box in surface contact therewith to seal the perforated top of said rear box, with said lip of said reciprocating means positively engaging the trailing end of the lowermost sheet of said stack upon activation of said pressure boxes, and means for applying a negative pressure in said boxes, whereby said lowermost sheet in said hopper means is pulled downwardly by the negative pressure in said boxes, with the trailing end of the lowermost sheet of said stack being engaged by said lip of said reciprocating means as it moves through the opening of said rear gate means to push said lowermost sheet bodily through the opening of said front gate means for further handling thereof.

9. A suction-type feeding system as recited in claim 8, and additionally means for applying negative pressure to said box.

10. A sheet feeding system as recited in claim 8, wherein said negative pressure box is formed of at least two spaced sections to handle sheets of varying length.

11. A sheet feeding system as recited in claim 8, wherein at least one of said gate means is adjustable to vary the size of at least one of said openings.

12. A sheet feeding system as recited in claim 8, and additionally means for periodically oscillating said reciprocating means in a predetermined cycle of operation.

13. A feeding system as recited in claim 8, wherein said gate means have tapered shapes so as to allow the lowermost said sheets in said hopper means to be pulled flat against the upper surface of said negative pressure box without jamming in said gate means.

14. A sheet feeding system for feeding sheets from a stack thereof, comprising, structure including a threshold member and gate means spaced therefrom to form an opening along one side of said stack for the passage of an outermost sheet of said stack through said opening, reciprocating means including a lip positioned along the opposite side of said stack, and means for initially engaging by suction at least a centermost portion of the surface of said outermost sheet of said stack and thereafter engaging by suction successive portions of at least some of the remaining surface of said sheet and for urging said outermost sheet towards said reciprocating means to insure positive engagement of said lip of said reciprocating means with the trailing end of said outermost sheet so that said lip of said reciprocating means pushes said outermost sheet through said opening between said threshold member and gate means.

15. A sheet feeding system for feeding sheets from a stack thereof, comprising, structure including a threshold member and gate means spaced therefrom to form an opening along one side of said stack for the passage of an outermost sheet of said stack through said opening, stationary means for engaging by suction the outermost sheet of said stack, means for exposing initially at least a centermost portion of one surface of said outermost sheet to an adjacent portion of said stationary means for suction adherence of said centermost portion thereto and thereafter exposing at least some of the remaining portions of said surface to adjacent portions of said stationary means for suction adherence of said remaining portions thereto, and reciprocating means including a lip positioned along the opposite side of said stack for positively engaging the trailing end of said outermost sheet and pushing said outermost sheet through said opening after the surface of said outermost sheet has been engaged by suction.

UNITED STATES PATENT OFFICE
CERTIFICATE OF CORRECTION

Patent No. 3,588,095           Dated June 28, 1971

Inventor(s)    Henry D. Ward, Jr., et al.

It is certified that error appears in the above-identified patent and that said Letters Patent are hereby corrected as shown below:

Column 3, lines 60 to 63, cancel "through said opening, means including a perforated vacuum box positioned below said stack for engaging by suction the bottom surface of the lower most sheet of said stack".

Signed and sealed this 22nd day of February 1972.

(SEAL)
Attest:

EDWARD M. FLETCHER, JR.           ROBERT GOTTSCHALK
Attesting Officer                   Commissioner of Patents